Aug. 21, 1951          H. P. PHILLIPS          2,564,993
PISTON RING ASSEMBLY
Filed Sept. 27, 1946
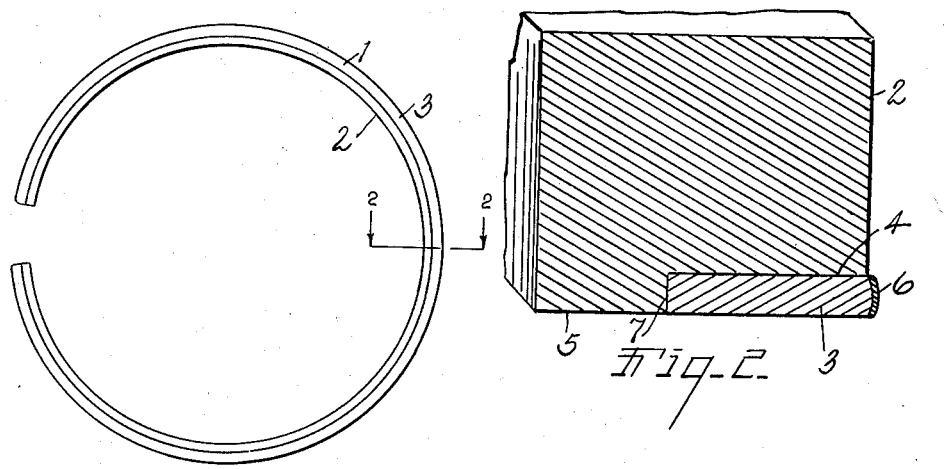
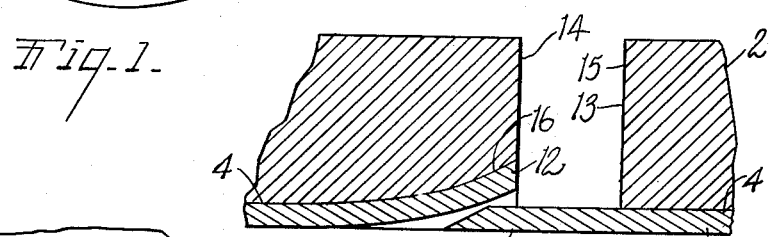
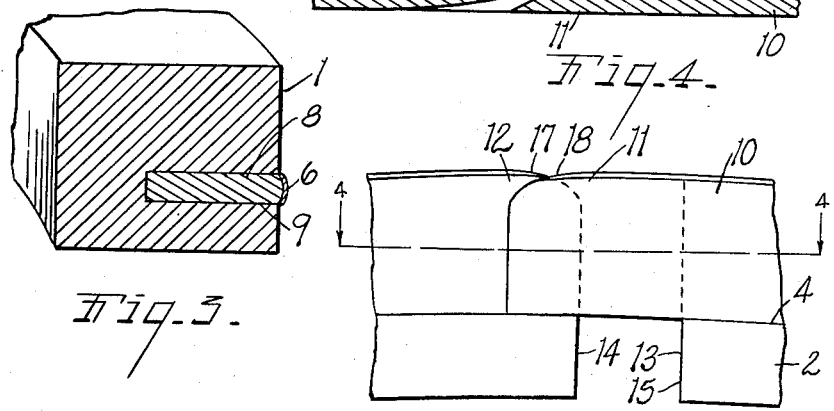
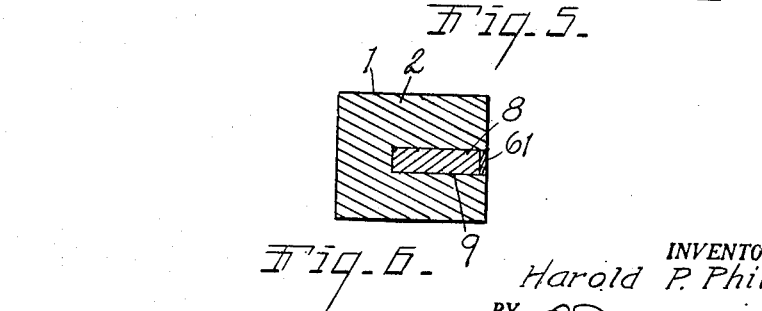
INVENTOR.
Harold P. Phillips
BY
ATTORNEY.

Patented Aug. 21, 1951

2,564,993

UNITED STATES PATENT OFFICE 2,564,993

PISTON RING ASSEMBLY

Harold P. Phillips, Hastings, Mich., assignor to Hastings Manufacturing Company, Hastings, Mich.

Application September 27, 1946, Serial No. 699,741

11 Claims. (Cl. 309—44)

This invention relates to improvements in a piston ring assembly.

The main objects of the invention are:

First, to provide a composite piston ring for internal combustion engine pistons having improved wearing properties.

Second, to provide a composite ring of the type described including a cylinder wall contacting element plated with a wear resistant material and carried by an element for imparting adequate cylinder wall tension thereto.

Third, to provide a composite piston ring of the type described which is characterized by its economy of production, by its effectiveness in operation and the ease with which it is installed Further objects relating to details and economies of the invention will appear from the description to follow. The invention is defined in the claims.

Preferred embodiments of the invention are illustrated in the accompanying drawing, wherein:

Fig. 1 is a bottom plan view of the composite piston ring with the parts in assembled relation.

Fig. 2 is an enlarged fragmentary view in section on the line 2—2 of Fig. 1.

Fig. 3 is an enlarged fragmentary view in perspective and in section at right angles to the plane of the ring, illustrating another embodiment of the invention.

Fig. 4 is a fragmentary view of a further embodiment of the invention, the view being in section at right angles to the plane of the ring element and parallel to the cylinder wall engaging surface thereof and on the line 4—4 of Fig. 5 and illustrating details of construction of the split end portions of the ring element.

Fig. 5 is a fragmentary view of the embodiment of Fig. 4, the view being a bottom plan and at right angles to the view of Fig. 4.

Fig. 6 is an enlarged fragmentary view of a further embodiment of the invention, the view being at right angles to the plane of the ring.

In the accompanying drawing wherein the assembly of my invention is illustrated generally in magnified form, I have made no attempt to illustrate the exact relative dimensions of the various parts.

Referring to the drawing and particularly to the embodiment illustrated in Figs. 1 and 2, the ring assembly designated generally by the numeral 1 consists of a split carrier ring element 2 and a thin split insert cylinder wall engaging element 3, mounted in the annular recess 4 in the side wall 5 of the ring element 2, and provided with a chrome plated cylinder wall engaging surface 6. The annular shoulder 7 of the recess 4 engages the member 3 and imparts sufficient radial thrust thereto to obtain the desired unit wall tension. The ring element 2 is preferably of cast iron and is of such sizes as to expansibly fit within a piston ring groove and support the element 3 with the desired unit pressure against the cylinder wall.

The cylinder wall engaging element 3 is formed of either soft or hard ribbon steel coiled edgewise, and due to the protection of the hard chrome edge 6, may preferably be soft and therefor quite inexpensive. A plurality of ring elements are produced by coiling this ribbon steel into relatively long spiral rolls, axially clamping the coils of the rolls into side by side closely abutting relation, chrome plating the edges thereof while the coils are so held and cutting the plated coils into individual ring elements. Chrome plating the insert member 3 which is of such material as adapts it to be plated in long spiral rolls, facilitates production of the composite compression rings at a lower cost than the production of cast iron ring elements individually chrome plated.

The chrome cylinder wall engaging surface of the ring 3 is from zero to .015 inch projection beyond the outer diameter of the cast iron body 2. This allows for the cast iron to get in contact with the cylinder wall or it can be made to prevent such contact until the ring is practically worn out. In the embodiment of the invention shown in Figs. 2 and 3 the chrome surface is disposed radially outwardly beyond the outer circumference of the carrier element 2, whereas in the embodiment of Fig. 6 the chrome surface 61 is flush with cylinder wall engaging surface of the carrier element 2 and is protected thereby against fracture or flaking from the rig element 8. As shown the chrome plating is curved outwardly beyond the upper and lower edges thereof. This provides a line-like contact of the surface with the cylinder wall for high unit pressure of said surface against the cylinder wall and provides oil pockets on opposite sides of said line like contact for efficient lubrication and long wear and protects such edges against fractures and scaling, particularly when disposed wholly or partially within outer diameter of the carrier element.

In the embodiment of Figs. 3 and 6 the insert ring member 8 is disposed in an annular recess or channel 9 spaced from the top and bottom sides of cast iron carrier or body member 1. The construction is otherwise similar to that of the embodiment of Figs. 1 and 2.

In the embodiment of Figs. 4 and 5 the cylinder wall engaging element 10 is disposed in the annular recess 4 in the bottom wall of the carrier element 2 and is provided with split end portions 11 and 12 disposed in overlapping relation, the end portion 11 also overlapping the gap 13 between the split end portions 14 and 15 of the cast iron body member 1. The annular recess 4 at one end thereof is provided with an axially or upwardly offset portion 16 and the end portion 12 of the insert ring element 10 is upwardly bent and disposed in said recess above the end portion 11 as shown in Fig. 4. The cylinder wall engaging edge of the insert ring member 10 at the ends thereof is ground away at 17 and 18 as shown in Fig. 5 to prevent the hard chrome scratching the cylinder wall. The overlapping end portions 11 and 12 of the insert ring element 10 being disposed as above set forth reduce the space opened up in the actual cylinder contacting part of the ring at the gap area. Chrome plating a cast iron ring instead of an insert member as above described, necessitates a considerable grinding at the joint area to prevent the chrome plating scratching the cylinder wall, this results in a considerable space being opened up in the actual cylinder contacting part of the ring at the gap area, which space may be eliminated or substantially reduced by the chrome plated overlapping end portions 11 and 12 disposed as above described.

I have illustrated and described my improvements in embodiments which I have found very practical. I have not attempted to illustrate or describe other embodiments or adaptations as it is believed that this disclosure will enable those skilled in the art to embody my improvements as may be desired.

Having thus described my invention, what I claim as new and desire to secure by Letters Patent, is:

1. A composite piston ring comprising an annular split carrier element adapted to be received within a piston ring groove for expansive action therein, and a split thin annular cylinder wall engaging element formed of ribbon steel coiled edgewise, said carrier element having a relatively narrow annular groove, said cylinder wall engaging element being disposed in said groove and having a chrome plated cylinder wall engaging surface disposed radially outwardly beyond the outer diameter of said annular carrier element.

2. A composite piston ring comprising an annular split cast iron carrier element adapted to be received within a piston ring groove for expansive action therein, and a split thin annular cylinder wall engaging element formed of relatively soft ribbon steel coiled edgewise, said carrier element having a relatively narrow annular groove, said cylinder wall engaging element being disposed in said groove and having a chrome plated cylinder wall engaging surface, the chrome plating projecting between zero and fifteen thousandths of an inch beyond the outer diameter of the cast iron carrier element, the chrome plating being curved outwardly beyond the upper and lower edges of the plating.

3. A composite piston ring comprising a split annular carrier element adapted to be received within a piston ring groove for expansive action therein and an insert split annular cylinder wall engaging element, said carrier element having a cylinder wall engaging surface and having a peripheral annular groove spaced from the upper and lower sides thereof, said insert cylinder wall engaging element being disposed in said groove and having a wear resistant plated cylinder wall engaging surface disposed flush with the cylinder wall engaging surface of said carrier element.

4. A composite piston ring comprising an annular split carrier element adapted to be received within a piston ring groove for expansive action therein and a split annular cylinder wall engaging element formed of ribbon metal coiled edgewise, said carrier element having a peripheral annular recess, said cylinder wall engaging element being disposed in said recess and having a plated wear resistant cylinder wall engaging surface disposed flush with the outer peripheral surface of said carrier element.

5. A composite piston ring comprising an annular split carrier element adapted to be received within a piston ring groove for expansive action therein and a split annular cylinder wall engaging element, said carrier element having a peripheral annular recess, said cylinder wall engaging element being disposed in said recess and having a plated wear resistant cylinder wall engaging surface disposed flush with the outer peripheral surface of said carrier element.

6. A composite piston ring comprising an annular split cast iron carrier element adapted to be received within a piston ring groove for expansive action therein and a split annular cylinder wall engaging element formed of relatively soft ribbon metal coiled edgewise, said carrier element having a peripheral annular recess, said cylinder wall engaging element being disposed in said recess and having a chrome plated wear resistant cylinder wall engaging surface, the plated surface being disposed to engage a cylinder wall and the plating being disposed substantially in vertical alinement with the outer peripheral wall of the carrier element and the steel portion of the chrome plated ring element being disposed in its approximate entirety within said annular recess of the carrier element.

7. A composite piston ring comprising an annular split carrier element adapted to be received within a piston ring groove for expansive action therein and a split annular cylinder wall engaging element of relatively soft ribbon steel coiled edgewise, said carrier element having a peripheral annular recess, said cylinder wall engaging element being disposed in said recess and having a chrome plated wear resistant cylinder wall engaging surface, the chrome plated wear resistant surface being disposed approximately between zero and .015 of an inch projection beyond the outer peripheral wall of said annular carrier element, the steel portion of the chrome plated ring element being disposed in its approximate entirety within the annular recess of the carrier element.

8. A composite piston ring comprising a split annular carrier element adapted to be received within a piston ring groove for expansive action therein, and a split annular cylinder wall engaging element formed of ribbon steel coiled edgewise, said carrier element having a peripheral annular recess in a side wall thereof, said annular recess having an axially offset portion at one end thereof, said cylinder wall engaging element being disposed in said annular recess and having a chrome plated cylinder wall engaging surface and having an axially offset end portion disposed in the axial offset portion of said annular recess and having an opposite end portion extending across the gap of the carrier element and overlapping said axially offset end portion.

9. A composite piston ring comprising a split annular carrier element adapted to be received within a piston ring groove for expansive action therein, and a split annular cylinder wall engaging element, said carrier element having a peripheral annular recess in a side wall thereof, said annular recess having an axially offset portion at one end thereof, said cylinder wall engaging element being disposed in said annular recess and having a chrome plated cylinder wall engaging surface, and having an axially offset end portion disposed in the axial offset portion of said annular recess and having an opposite end portion extending across the gap of the carrier element and overlapping said axially offset end portion.

10. A composite piston ring comprising a split annular carrier element adapted to be received within a piston ring groove for expansive action therein, and a split annular cylinder wall engaging element, said carrier element having a peripheral annular recess, said annular recess having an axially offset portion at one end thereof, said cylinder wall engaging element being disposed in said annular recess and having a chrome plated cylinder wall engaging surface, and having an axially offset end portion disposed in the axial offset portion of said annular recess and having an opposite end portion extending across the gap of the carrier element and overlapping said axially offset end portion.

11. A composite piston ring comprising a split annular carrier element adapted to be received within a piston ring groove for expansive action therein, and a split annular cylinder wall engaging element, said carrier element having a peripheral annular recess, said annular recess having an axially offset portion at one end thereof, said cylinder wall engaging element being disposed in said annular recess, and having an axially offset end portion disposed in the axial offset portion of said annular recess and having an opposite end portion extending across the gap of the carrier element and overlapping said axially offset end portion.

HAROLD P. PHILLIPS.

REFERENCES CITED

The following references are of record in the file of this patent:

UNITED STATES PATENTS

| Number | Name | Date |
|---|---|---|
| 1,956,014 | Fink | Apr. 24, 1934 |
| 2,212,042 | Phillips | Aug. 20, 1940 |
| 2,229,107 | Luthy | Jan. 21, 1941 |
| 2,252,199 | Phillips | Aug. 12, 1941 |
| 2,313,395 | Phillips | Mar. 9, 1943 |

OTHER REFERENCES

"Recent developments in piston rings for high-speed Diesels," page 650, Aug. 1942, Diesel Power and Transportation.